Patented Sept. 6, 1932

1,875,494

UNITED STATES PATENT OFFICE

WALTER P. RALEIGH, OF AMES, IOWA, AND CROMWELL B. DICKEY, OF MILWAUKEE, WISCONSIN, ASSIGNORS TO PITTSBURGH PLATE GLASS COMPANY, A CORPORATION OF PENNSYLVANIA

ART OF DISINFECTING SEEDS

No Drawing. Application filed February 6, 1928. Serial No. 252,425.

The present invention relates to improvements in the art of disinfecting corn or like seeds and to the treated seed products. While the present invention is particularly applicable to seed corn, in preventing attack by certain known internal parasites as *Diplodia zeae*, *Basisporium gallarum* and *Gibberella sanbinetii*, it is not limited thereto, as it may be employed in treating seeds subject to attack by dry rots and surface-born fungi. However, it is not applicable to certain internal plant parasites, as the loose smuts on wheat and barley.

In carrying out the present invention, we apply to the seeds to be treated or disinfected an adherent finely pulverized material or dust comprising an inert material, such as graphite, talc or other silicious material and an insoluble carbonate of mercury. The carbonate of mercury may suitably be prepared by the reaction of an alkali metal carbonate such as potassium or sodium carbonate or bicarbonate upon a soluble mercury salt, such as mercuric nitrate, mercuric chloride or the like or by other known methods. Thus, in preparing a suitable basic mercury carbonate, 33 parts by weight of soda ash or 52 parts by weight of sodium bicarbonate, previously dissolved in 600 parts by weight of water, are added with vigorous stirring to 81.5 parts by weight of mercuric chloride dissolved in 2000 parts by weight of water. The reaction may be carried out in a similar manner, replacing the mercuric chloride with 78.5 parts by weight of mercuric nitrate.

In carrying out the reaction it is preferred that the temperature be held below 40° C. The precipitated carbonate compound is separated, suitably filtered, dried, powdered and mixed with the desired proportion of the inert material. It is readily apparent, however, that the inert material may be present in the reaction mixture during the reaction, being kept in suspension by vigorous agitation, in which case the carbonate will be deposited superficially upon the particles of inert material as it is precipitated. Or a portion of the desired quantity of inert material may be so present in the reaction, thus producing a composition of inert material and carbonate compound which is more concentrated in the latter than the desired material, and additional inert material may be admixed with this concentrated composition to secure the desired concentration of the carbonate compound.

The mercury carbonate compounds are effective when present in the composition in proportions to provide 2.5% mercury or higher. In general, we prefer to employ them in proportions sufficient to give 8 to 10% mercury in the composition. Very substantially higher proportions may be employed, up to about 35% mercury, without appreciable injury to the seeds to which the composition is applied.

The inert material may be any finely powdered, adherent, inactive insoluble substance as finely divided silica, kieselguhr, silicates, such as talc, graphite or the like. Different inert constituents may be mixed, if desired. The use of graphite as part or all of the inert material is particularly advantageous, by reason of the lubricating effect it has upon the planting machinery in which the treated seed is used.

The composition containing the mercury carbonate compound is applied to the seeds in any desired proportion, it being found that ordinarily about 2 ounces is consumed per bushel of seed.

It is appreciated that various carbonate compounds are formed by the interaction of carbonates upon mercury compounds in solution, according to the conditions of reaction, temperature, proportions of reagents, etc. However, it has been found that the carbonate compounds thus formed are all effective, notwithstanding their variations in composition.

We claim:

1. The herein described finely powdered disinfectant for corn and like seeds comprising an inert carrier and a basic mercury carbonate compound.

2. The herein described finely pulverized disinfectant for corn and like seeds containing an inert carrier and basic mercury carbonates in proportion to supply at least 2.5% of mercury.

3. The herein described finely powdered disinfectant for corn and like seeds consisting of an inert carrier and basic mercury carbonates in proportion to supply 8 to 10% mercury.

4. The herein described finely pulverized disinfectant for corn and like seeds consisting of an inert carrier comprising graphite and basic mercury carbonate.

WALTER P. RALEIGH.
CROMWELL B. DICKEY.